June 1, 1943.　　　M. W. McCOMBS　　　2,320,631
HEAVY DUTY TRAILER
Filed May 11, 1942　　　2 Sheets-Sheet 1
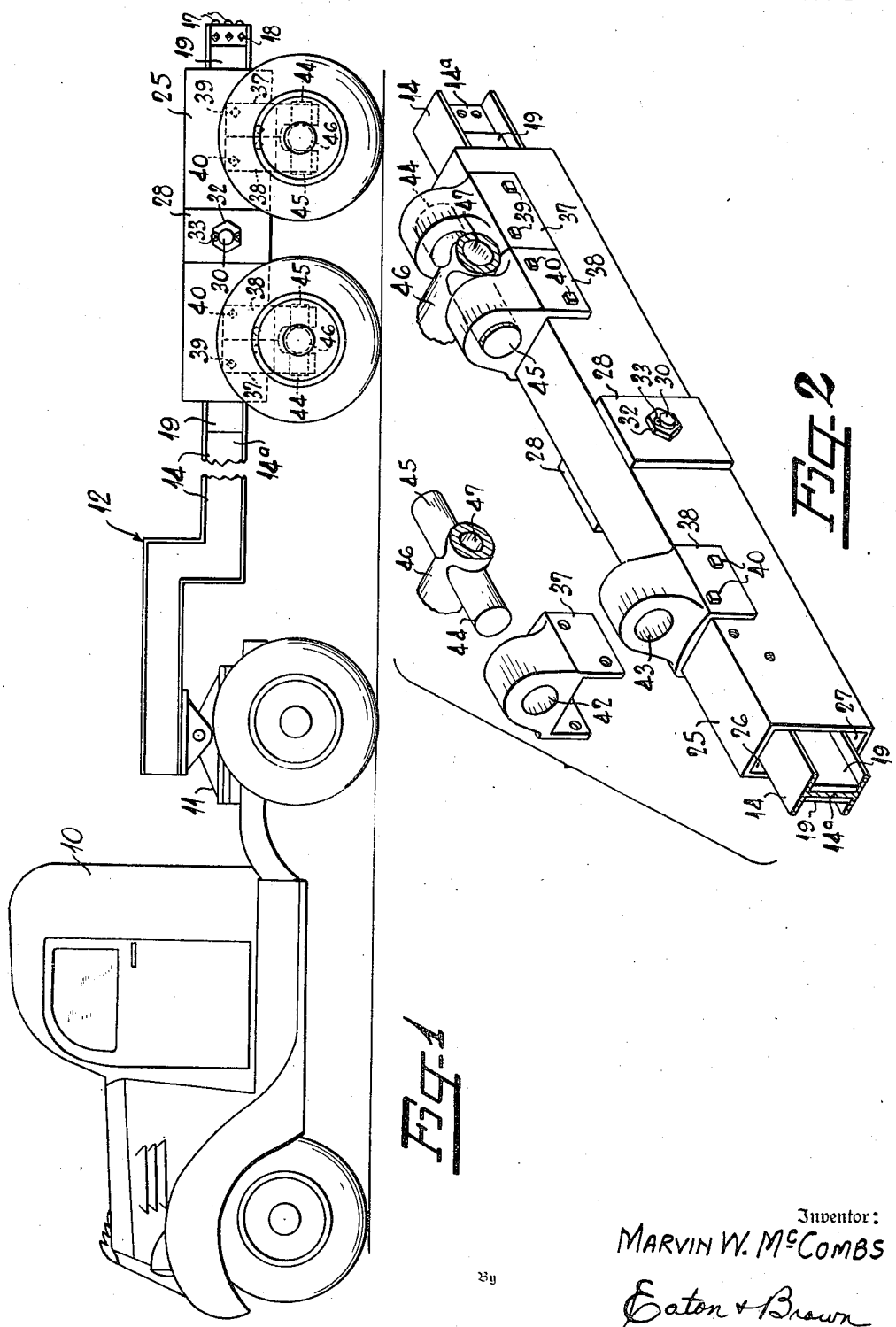
Inventor:
MARVIN W. McCOMBS
By Eaton & Brown
Attorneys

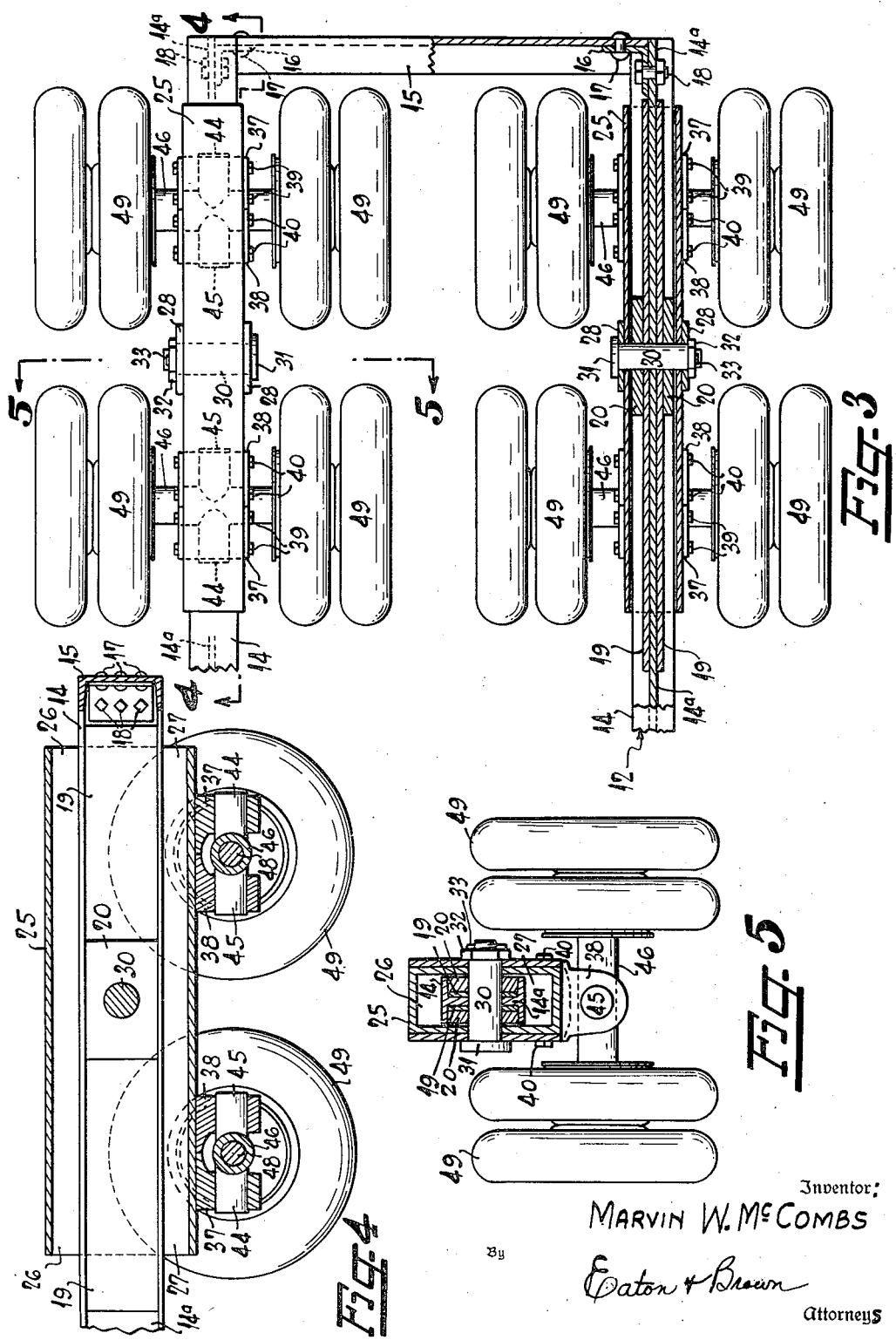

Patented June 1, 1943

2,320,631

UNITED STATES PATENT OFFICE 2,320,631

HEAVY DUTY TRAILER

Marvin W. McCombs, Statesville, N. C.

Application May 11, 1942, Serial No. 442,403

4 Claims. (Cl. 280—81)

This invention relates to a trailer construction and more especially to trailers of the heavy duty type where it is necessary to move heavy loads such as excavating machinery from place to place.

Care must be taken to prevent damage to the road over which such machinery is transported because roads are generally designed to support a predetermined pressure per square inch. Therefore, when a heavy load is to be transported, the wheel structure of the supporting vehicle must have a contacting surface with the roadway sufficient to reduce the pressure per square inch within the permitted range. Heavy duty trailers are accordingly supported by several wheels in order to obtain the proper roadway bearing surface. Where a number of wheels are employed, it is preferable to place as many wheels as possible in a group and then mount the group for universal movement to the trailer chassis. Obviously the reason for universally mounting each group of wheels is to permit the wheels to adjust themselves to irregular contours of the road surface and thereby permit each wheel to always carry its share of the load.

Much difficulty has heretofore been encountered in properly securing these groups of wheels to the trailer chassis on account of the side sway. Unless the mounting is so constructed that lateral movement will be eliminated, an excess amount of wear will be produced upon the universal pivots and thus cause the trailer to sway laterally of the roadway while in motion.

It is an object of this invention to provide a wheel mounting for heavy duty trailers in which a novel construction is employed for preventing lateral movement of the wheels while the trailer is in motion. The present construction comprises an elongated trailer chassis beam which is encased in an elongated box-like rectangular axle support, said axle support being secured, intermediate its ends, to the chassis beam by means of a transverse pivot. This axle support has a wheeled axle secured thereto on each side of the transverse pivot by means of longitudinal pivots which are disposed substantially at right angles to the transverse pivot. The side walls of the rectangular support slidably fit against the opposed sides of the chassis beam; however, the upper and lower portions of the beam are normally disposed in spaced relation to the upper and lower interior walls of the rectangular support. This space permits a limited amount of oscillation of the support about the transverse pivot before the top or the bottom of the chassis beam is engaged. Since the side walls of the support fit against the opposed sides of the beam for the entire length of the support, there can be very little, if any, lateral play while the support oscillates and, therefore, the wheeled axles, which are attached to the ends of the support, will be held rigidly in position and not permitted to sway laterally.

It is another object of this invention to provide a wheel mounting for heavy duty trailers, which mounting is constructed so that the supported chassis beam will have a low center of gravity and yet permit universal movement of the wheels. This low center of gravity is made possible by the use of the above-named rectangular housing or support. A single transverse pin penetrates the side walls of the housing and also the chassis beam, thus lowering the top of the chassis beams.

Some of the objects of the invention having been stated, other objects will appear as the description proceeds, when taken in connection with the accompanying drawings, in which—

Figure 1 is an elevation showing a tractor, and an attached trailer embodying my invention;

Figure 2 is an inverted, partially exploded, isometric view of one of the trailer chassis beams showing the detailed construction of the universal wheel mount;

Figure 3 is a sectional plan view of the right-hand portion of Figure 1;

Figure 4 is a vertical sectional view taken along the line 4—4 in Figure 3;

Figure 5 is a transverse vertical sectional view taken along the line 5—5 in Figure 3.

Referring more particularly to the drawings, the numeral 10 denotes an automobile tractor of conventional make to which is attached near the rear end thereof a conventional fifth wheel construction 11. This fifth wheel 11 connects the tractor 10 to my novel trailer, which is broadly designated by the reference character 12.

The trailer comprises a pair of longitudinally disposed I-beams 14 having the trailing ends thereof spaced apart from each other and secured together by means of a transverse channel strut 15. Each end of channel strut 15 has one leg of an angle iron 16 secured thereto by any suitable means such as rivets 17, the other leg of each angle iron being removably secured to a web 14a of I-beam 14 by any suitable means such as bolts 18. It is, of course, evident that the I-beams 14 will be secured together at other points throughout their length in a conventional manner, but since the manner in which the I-beams are spaced apart from each other is not a part of the present invention it is not thought necessary to disclose this construction.

The web 14a of each chassis I-beam 14 is reinforced near the trailing end thereof by means of suitable web plates 19 and 20, there being a plate 19 fitting against each side of the web 14a and a plate 20 secured to the outer surface of each plate 19. The purpose of providing reinforcing plates 19 and 20 is to insure that the proper bearing surface will be present for a pin 30 which penetrates the beam and supports the wheel mounting. Also each I-beam 14 and the web plates are encased by an elongated rectangular support or housing 25.

The interior vertical side walls of support 25 snugly and slidably fit against the opposed edges or toes of the I-beam flanges whereas the upper and lower interior walls of the rectangular support are normally disposed in spaced relation to the upper and lower flanges of the I-beam. This upper and lower spacing is clearly shown in Figure 4. It is here seen that a space 26 is provided between the upper flange of the I-beam 14 and the lower interior top wall of rectangular support 25. A similar space 27 is provided between the lower flange of the I-beam and the interior bottom wall of suport 25. The rectangular support 25 has suitable reinforcing plates 28 secured to its outer side walls, and these plates also serve to increase the bearing surface for the pin 30 which supports the wheel mounting.

The rectangular housing 25 is pivotally secured to the longitudinal I-beam 14 by means of the transversely disposed pin 30. This pin penetrates reinforcing plates 28, the side walls of rectangular housing or support 25, plates 19 and 20, and the web 14a of the I-beam 14. The pin has a head portion 31 and a nut 32 threadably secured on the small end. A suitable cotter key 33 is employed for holding the nut on one end of the pin.

Since the side walls of the rectangular housing fit snugly against the opposite sides of I-beam 14, the housing will not be permitted to move laterally an appreciable amount during its oscillation about pin 30. The oscillation of the housing about this pin will be limited when the upper or lower wall of the housing strikes the top or bottom flange of the I-beam 14. In other words, the housing 25 is laterally guided throughout its length because the housing side walls fit against the I-beam, and the angle through which the housing rotates about the supporting pin 30 is determined by spaces 26 and 27.

Each end of the rectangular housing or support 25 is supported by a transverse wheel axle, each of said wheel axles being attached to the housing by a longitudinal pivot which is positioned approximately 90 degrees to the pivot 30 previously described. The purpose of positioning one pivot at right angles to the other is to provide a limited amount of universal movement for the wheel assemblies to cause the wheels to adjust themselves to the irregular contours of the roadway and therefore assume the proper share of the load at all times.

This pivoted axle support is clearly shown in Figures 2 and 4. It is here seen that a pair of U-shaped brackets 37 and 38 are adapted to fit, side by side, near each end of the rectangular housing 25. Suitable stud bolts 39 and 40 respectively are employed for holding the brackets 37 and 38 in position upon the housing. The brackets 37 and 38 have longitudinal bores 42 and 43 respectively therein which receive projections 44 and 45 respectively, extending from the opposed sides of an axle housing 46, said axle housing having a bore 47 therein which receives an axle 48. Disposed upon each end of the axle is a wheel assembly 49.

It is therefore seen that each axle 46 and its associated wheels are permitted to rock about a longitudinal pivot provided by studs 44 and 45 and brackets 37 and 38. At the same time the axle 46 and associated wheels are permitted to rise and fall bodily along with the ends of rectangular housing 25, while the housing oscillates about the transverse pin 30, thereby providing a limited universal movement for each group of wheels.

In the preceding description only one chassis beam 14 and its associated supporting structure has been described. In the present disclosure two chassis beams are shown together with the supporting wheel structures, but since both groups are identical, a description is made of only one and similar reference characters are given to the other.

In the drawings and specification, there has been set forth a preferred embodiment of the invention and although specific terms are employed, they are used in a generic and descriptive sense only and not for the purposes of limitation, the scope of the invention being defined in the claims.

I claim:

1. Trailer construction comprising a chassis beam, a housing encasing said beam, said housing being secured intermediate its ends to said beam by means of a transverse pivot, the ends of the housing being substantially larger at the top and bottom portions than the beam which it encases to thereby permit limited oscillation of said housing about said pivot, and a transverse wheeled axle secured to said housing on each side of said transverse pivot by means of a longitudinal pivot, said longitudinal pivot being disposed in a plane substantially parallel to a plane passing through the transverse pivot and positioned substantially at right angles to said transverse pivot.

2. Trailer construction comprising a chassis I-beam, a rectangular housing encasing said beam, the vertical walls of said housing slidably fitting against the flange toes of said I-beam and the upper and lower horizontal housing walls being disposed in spaced relation to the upper and lower horizontal flange surfaces respectively, a transverse pin penetrating the web of said I-beam and the vertical walls of said housing whereby the housing will be permitted to oscillate a limited amount about said pin, and a transverse wheeled axle secured to said housing on each side of said transverse pin by means of a longitudinal pivot, said longitudinal pivot being disposed in a plane substantially parallel to a plane passing through the transverse pin and positioned substantially at right angles to said transverse pin.

3. Trailer construction comprising an elongated chassis beam, an axle support secured intermediate its ends to said beam by means of a transverse pivot, a wheeled axle secured intermediate its ends to each end of said support by means of a longitudinal pivot, said longitudinal pivot being disposed in a plane substantially parallel to a plane passing through the transverse pivot and positioned substantially at right angles to said transverse pivot, guide members carried by said support and slidably engaging the opposed sides of said beam whereby lateral deflection of the axle support will be prevented when the support oscillates about said transverse pivot, and means carried by the end of said axle support for limiting the amount of vertical oscillation of said support in both directions about said transverse pivot.

4. Trailer construction comprising a chassis I-beam, a rectangular housing encasing said beam, the vertical walls of said housing slidably fitting against the flange toes of said I-beam and the upper and lower horizontal housing walls being disposed in spaced relation to the upper and lower horizontal flange surfaces respectively, a transverse pin penetrating the web of said I-beam and the vertical walls of said housing whereby the housing will be permitted to oscillate a limited amount about said pin, a pair of U-shaped brackets secured to said housing on each side of said transverse pin, each pair of brackets having alined longitudinal holes therein, a pair of alined studs rotatably mounted in each pair of alined holes, and a transverse wheeled axle carried by each pair of said studs, said studs being disposed in a plane parallel to a plane passing through the transverse pin and being positioned substantially at right angles to said transverse pin.

MARVIN W. McCOMBS.